US012316649B2

(12) United States Patent
Rath et al.

(10) Patent No.: US 12,316,649 B2
(45) Date of Patent: May 27, 2025

(54) METHOD TO DETECT EXTERNAL ATTACKS ON CLOUD DATA FROM WITHIN APPLICATION

(71) Applicant: EMC IP Holding Company LLC, Hopkinton, MA (US)

(72) Inventors: Jagannathdas Rath, Bengaluru (IN); Kalyan C. Gunda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 378 days.

(21) Appl. No.: 17/450,196

(22) Filed: Oct. 7, 2021

(65) Prior Publication Data

US 2023/0116463 A1 Apr. 13, 2023

(51) Int. Cl.
*H04L 9/00* (2022.01)
*H04L 9/40* (2022.01)

(52) U.S. Cl.
CPC ...... *H04L 63/1416* (2013.01); *H04L 63/0435* (2013.01); *H04L 63/083* (2013.01); *H04L 63/102* (2013.01); *H04L 63/12* (2013.01); *H04L 63/1466* (2013.01); *H04L 63/20* (2013.01)

(58) Field of Classification Search
CPC ............ H04L 63/1416; H04L 63/0435; H04L 63/083; H04L 63/102; H04L 63/12; H04L 63/1466; H04L 63/20; H04L 63/104
See application file for complete search history.

(56) References Cited

U.S. PATENT DOCUMENTS

| 10,198,605 | B1* | 2/2019 | Salour | G06F 21/445 |
| 11,736,525 | B1* | 8/2023 | Rungta | G06F 21/604 |
| | | | | 726/1 |
| 2019/0394206 | A1* | 12/2019 | Zezza | H04L 63/105 |
| 2020/0145515 | A1* | 5/2020 | Fleck | H04L 63/1441 |
| 2020/0272742 | A1* | 8/2020 | Kataria | G06F 21/577 |

OTHER PUBLICATIONS

NPL Titled "How to Configure SSH Key-Based Authentication on a Linux Server"; Date Published Jun. 21, 2021 (Year: 2021).*

* cited by examiner

*Primary Examiner* — Syed M Ahsan

(74) *Attorney, Agent, or Firm* — Workman Nydegger

(57) ABSTRACT

One example method includes a data protection operation such as an attack prevention or remediation operation. Policies, such as user policies, role policies, and/or container policies, are created. Prior to attaching to a user or a container, checksums are generated. After the policies are attached to the user or container in the cloud, changes to the policies can be detected using the previously generated checksums and comparing to checksums generated from the cloud policies. Corrective actions are taken when the comparison fails.

20 Claims, 6 Drawing Sheets

METHOD TO DETECT EXTERNAL ATTACKS ON CLOUD DATA FROM WITHIN APPLICATION

FIELD OF THE INVENTION

Embodiments of the present invention generally relate to data protection and data protection operations. More particularly, at least some embodiments of the invention relate to systems, hardware, software, computer-readable media, and methods for protecting data including cloud data.

BACKGROUND

Cloud storage (e.g., datacenters) is becoming increasingly important and is used by many different entities including governments, businesses, and consumers. A common use of cloud storage is for storing backups. Backup applications, for example, often move backups to, or create backups in, the cloud. When data is transferred to the cloud or moved intra-cloud, the movement is often governed by rules. For example, a backup server may be configured to move data that is older than two weeks to the cloud.

Cloud providers ensure that backup applications or backup servers access cloud storage with proper authentication or authorization. This is important because malicious acts including cyber-attacks and ransomware attacks, are focusing more on cloud storage in addition to local storage. In order to gain access to a bucket and cause problems (e.g., delete data, encrypt data for ransom), the attacker typically needs to use compromised authentication information. Once the authentication information is compromised, the credentials can then be used to access the data in an unauthorized manner.

Currently, unauthorized access to data may not be discovered for some period of time. A user or administrator may not realize that the data has been deleted or is not recoverable until it is too late to recover the data or too late to take protective actions. The administrator, in fact, often has no indication that their data has been accessed in an unauthorized manner until it is too late.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
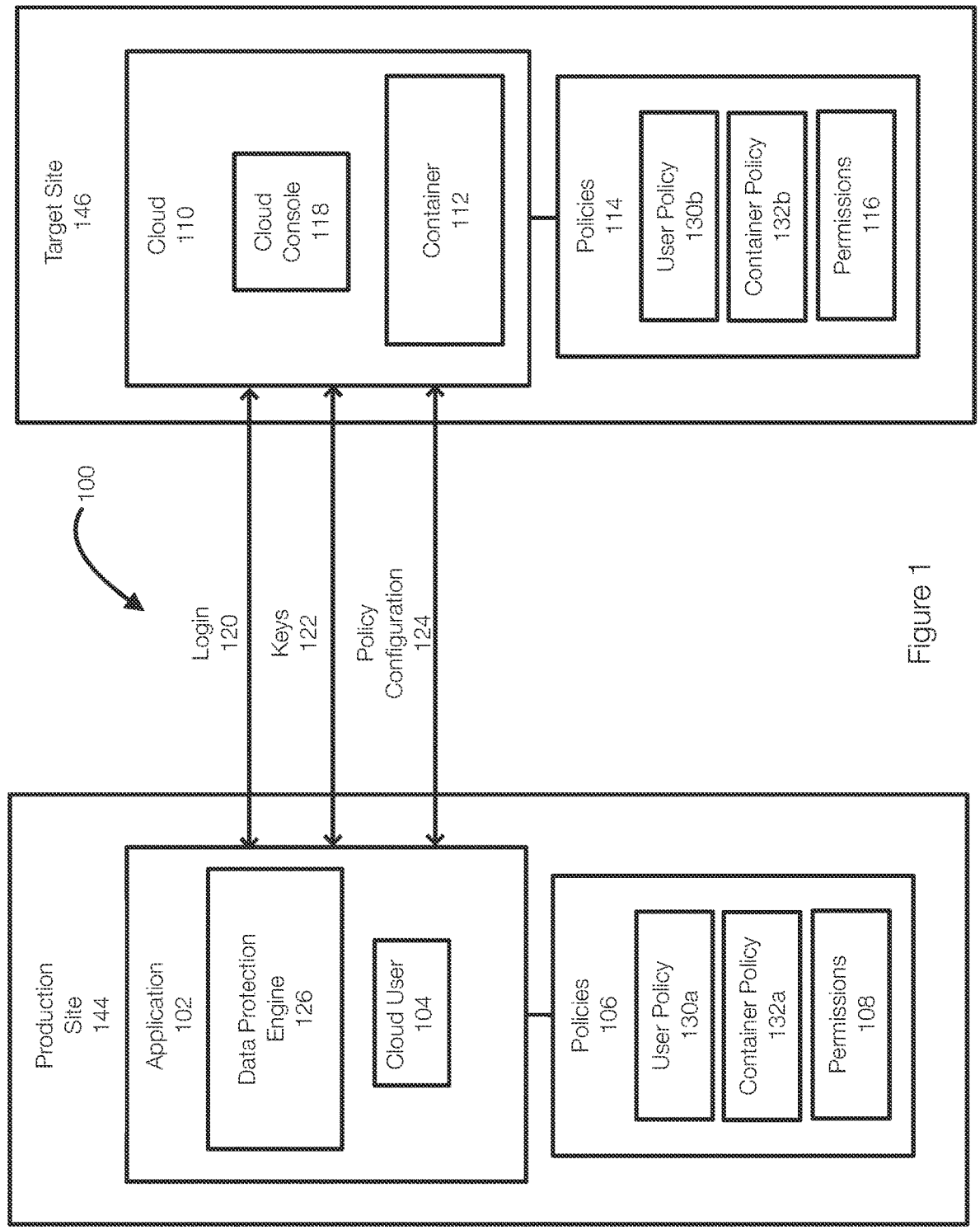
FIG. 1 discloses aspects of a computing system or a computing environment in which policy-based data protection operations including attack detection, attack prevention operations, and corrective actions are performed.

Embodiments of the present invention generally relate to data protection operations. More particularly, at least some embodiments of the invention relate to systems, hardware, software, computer-readable media, and methods for data protection operations including backup operations, attack detection operations, attack prevention operations, corrective actions, policy operations, cloud access operations, and the like or combination thereof.

As used herein, a container is an example of a structure for storing data in cloud storage (or other storage). A container may be configured to store data, by way of example only, using block-based storage, object-based storage, or the like. Containers may be referred to by different names. Terms such as containers, buckets, or the like are used herein to refer to cloud based storage or the manner in which data is stored in the cloud. For example, containers or buckets also provide a way to control access. Access to a specific container or bucket may require credentials such as a username/password.

While credentials are often used to access a container or to access, more generally, a cloud console that allows a user to perform various operations in the cloud relative to an account, applications often use access keys. Access keys are examples of keys that allow programmatic access to containers/data and are distinct from user credentials. An attacker that has the access keys may be able to programmatically compromise data.

For example, an attacker may use compromised user credentials to generate new access keys. The new access keys can then be used maliciously. An attacker may also modify the permissions or policies attached to a user or to the container and then use the user's credentials to attack the data. Similarly, an attacker may alter policies attached to roles so that the roles can be assumed by other entities (e.g., another virtual machine or application). Container (e.g., bucket) policies can also be altered or compromised to gain unauthorized access to cloud data.

In general, example embodiments of the invention operate to detect breaches or attacks on data stored in cloud storage. For convenience, embodiments of the invention are discussed with respect to containers that may store data as objects or blocks. Embodiments of the invention, however, are not limited thereto.

Embodiments of the invention are configured to detect an attack during early stages of the attack or before the attack can harm or compromise the data. Embodiments of the invention allows administrators (or others) to be notified of possible/actual attacks and to take preventative/defensive/corrective actions. Corrective actions may include terminating all access to the data, revoking keys, revoking/changing credentials, invalidating policies, or the like or combination thereof.

Generally, embodiments of the invention generate and apply policies, which may include user policies, container policies, role policies, or the like or combination thereof. To perform attack related operations including attack detection or attack prevention operations, embodiments of the invention may perform some preparatory or initial operations. For example, the user policies, container policies, role policies, and the like or combination thereof are sanitized to ensure that the user (or application or process or role) only has permissions or access that are required in the application or to ensure that the container or data is accessible by only one configured user or, for role based access, to ensure that the container or data is accessible by only one specific virtual machine attached to the role.

Sanitizing the policies may include one or more of deleting existing policies, creating new policies, altering existing policies, or the like. Sanitizing the policies may include sanitizing user policies, role policies, container policies, or the like, to account for different types of access (e.g., key based access, role based access). Embodiments of the invention prepare the policies such that changes to the policies are required before the data itself can be attacked. When the change in policy is detected or when other validations fail, an appropriate response can be performed. In one embodiment, the sanitized policies ensure that the user only has a necessary set of permissions.

These policies may be generated (e.g., in XML form) and then applied in the cloud, using by way of example only, REST APIs (Application Programming Interfaces). The policies may also be stored locally as local policies. Thus, the local policies are copies of policies that have been applied in the cloud. A checksum or other identifier or unique value may be generated from the local policies and stored as local checksums. As used herein, a checksum is an example of a representation of a data such as a policy. A checksum is typically derived from the data being represented by the checksum and is typically unique. Embodiments of the invention may also perform other validations when performing attack related operations.

To determine whether data has been attacked, a validation process may be performed. The validation process may be performed periodically (e.g., every few minutes or other schedule). The validation process may check and validate the policies by comparing checksums generated from existing policies in the cloud to the local checksums. If the checksums of the local policy and the policy applied in the cloud do not match, an attack may be presumed. The validation process may also validate the access and secret keys, the login capability of the user, and the policies.

In one example when checking or validating the policies, the policies may be fetched from the cloud. A checksum value is generated from the retrieved policies and compared to the corresponding local checksum. If a mismatch or other anomaly is detected, an alert or notification is generated such that an administrator can perform corrective or preventative actions. In some examples, corrective or preventative actions may be performed automatically upon a validation failure.

FIG. 1 discloses aspects of a computing environment for implementing data protection operations including attack related operations such as attack detection and attack prevention operations. FIG. 1 illustrates a system 100 in which an application 102 is configured to communicate with a cloud 110 and more specifically with a container 112 in the cloud. The application 102 may operate on or include a computing device (e.g., processors, memory, networking hardware). The application 102, in this example, may be configured to perform data protection operations for a production site 144. For example, the application 102 may generate backups (copies, replicas, mirrors, backups of various types) of applications/data at the production site 144 that are transmitted to and stored in a container 112 in a cloud 110. The production site 144 may be an on-site system, a cloud-based system, or the like.

The container 112 at the target site 146 stores backups of the production site 144. The container 112 is representative of constructs used to store data. Thus, the container 112 may have various forms that may store data in different manners. For example, the container 112 may be a bucket that stores objects, blocks, or the like. Thus, the container 112 (or more generally the storage provided by the cloud 110) may include object-based storage, block-based storage or the like.

In this example, the application 102 is configured as a cloud user 104 and the container 112 is configured to be solely used and managed by the application 102. In one example, a dedicated cloud user 104 and a dedicated container 112 are configured in the application 102. The cloud 110 may provide a cloud console 118 that allows cloud users, such as the user 104 to be managed. The cloud console 118 may also be used to manage the data and storage in the cloud.

The following discussion may refer to the application 102 or the user 104 performing various actions. However, actions performed by the user 104 are typically performed at the behest of the application 102 at least because the user 104 is configured in the application 102 in one example.

FIG. 1 further discloses aspects of allowing the application 102 to access and use the container 112 using permanent (but changeable if desired) keys. Prior to performing various data protection operations, it may be necessary to perform some initialization actions that may not be repeated frequently. For example, the user 104 (or an administrator or root user) may first login 120 to the cloud 110 using the cloud console 118 with credentials such as a username and a password. This allows access keys 122 to be generated. The user 104 or application 102 may receive the access keys 122, which may include by way of example, an access key and a secret key. These keys 122 allow programmatic access to the cloud 110 and the container 112. The keys 112 may be used to sign programmatic requests.

Next, policy configuration 124 may be performed. The types of policies that are created/amended/deleted may depend on the type of access that is needed. The policies associated with access using permanent keys 122 may differ from the policies associated with role based access or other access paradigms.

To perform data protection operations including attack related operations, embodiments of the invention configure the policies 114. The policies 114 may include one or more of, by way of example only, a user policy 130b and a container policy 132b. Copies of the user policy 130b and the container policy 132b may be kept on disk by the application 102 as a user policy 130a and a container policy 132a. Stated differently, the policies 106 are local policies that are copies of the policies 114 implemented in the cloud 110.

Thus, the policies 106 are a copy of the policies 114 and the permissions 108 are a the same as the permissions 116. This allows the user 104 to determine whether unauthorized changes have been made to the policies 114 and/or permissions 116. Detecting a change in the policies 114 allows corrective (also referred to as protective) actions to be performed and thus protect any data stored in the container 112.

The cloud user 104 is provided with or generates the policies 106 and permissions 108 that are needed by the application 102 to perform the functions of the application 102. Any other existing permissions are sanitized or removed from the policies 106. This ensures that the keys 122 can only be used for the necessary permissions 108 as set forth in the policies 106. For example, an application that is restoring from a backup may only need read permissions. The permissions for a restore application may not include write permissions.

The permissions 108 in the policies 106 may include user administration permissions at least because the user 104 is within the application 102 in one example. The permissions 108 may include container 112 access permissions so that the container 112 can be accessed, cloud function permissions so that cloud functions can be executed, log access permissions when access to logs is needed. Other permissions, such as batch operation permissions or the like may also be added.

When performing policy configuration 124, the policies 106 may be stored on disk in the application 102 after the policies 106 are prepared. Further, a checksum (or other unique representation) of the policies 106 may be generated and stored separately in a location that can be accessed by the application 102. In this example, a local checksum for each specific policy may be generated and stored locally or in a location different from the container 112 or the policies 114.

Once the policies 06 are prepared, REST APIs of the cloud 110 may be used to attach the policies 106 to the cloud user 104 or to the container 112 as appropriate. As previously stated, all other pre-existing permissions and policies for the same cloud user 104 are deleted in the cloud 110. At this stage, the cloud user 104 should only have the permissions specified in the policies 106, or more specifically, the user policy 130a that has been created.

Next, the login capability of the application or user 104, using user credentials, is removed. Because the application 102 is using the keys 122 for programmatic access, the user 104 is not allowed to login to cloud console 118 using credentials such as a username/password. In the cloud, the user 104 is also removed from any other policies or groups to ensure that the user 104 does not receive any additional permissions by being associated with other user groups in the cloud 110.

As previously indicated, the container 112 may have been previously created or the container 112 is created by the application 102. The application 102 then generates a container policy 132a for the container 112 and the data or objects stored therein. The container policy 132a only allows access to the current cloud user 104. The application 102 can also define the cloud operations that can be performed by the user 104. With this policy, no user, other than the cloud user 104, can access the container 112 and the user 104 is limited to the permissions 108 in the policy 132a.

The container policy 132a is stored in the policies 106 along with the user policy 130a. A checksum of the container policy 132a may also be generated and stored as a local checksum.

Once the container policy 132a is prepared, the container policy 132a is applied to the container 112 as the container policy 132b. Thus, the user in the cloud is attached to the user policy 130b and the container 112 is attached to the container policy 132b.

Next, the keys 122 are regenerated to ensure that no entity outside the application 102 has access to the keys 122.

Figure 2:
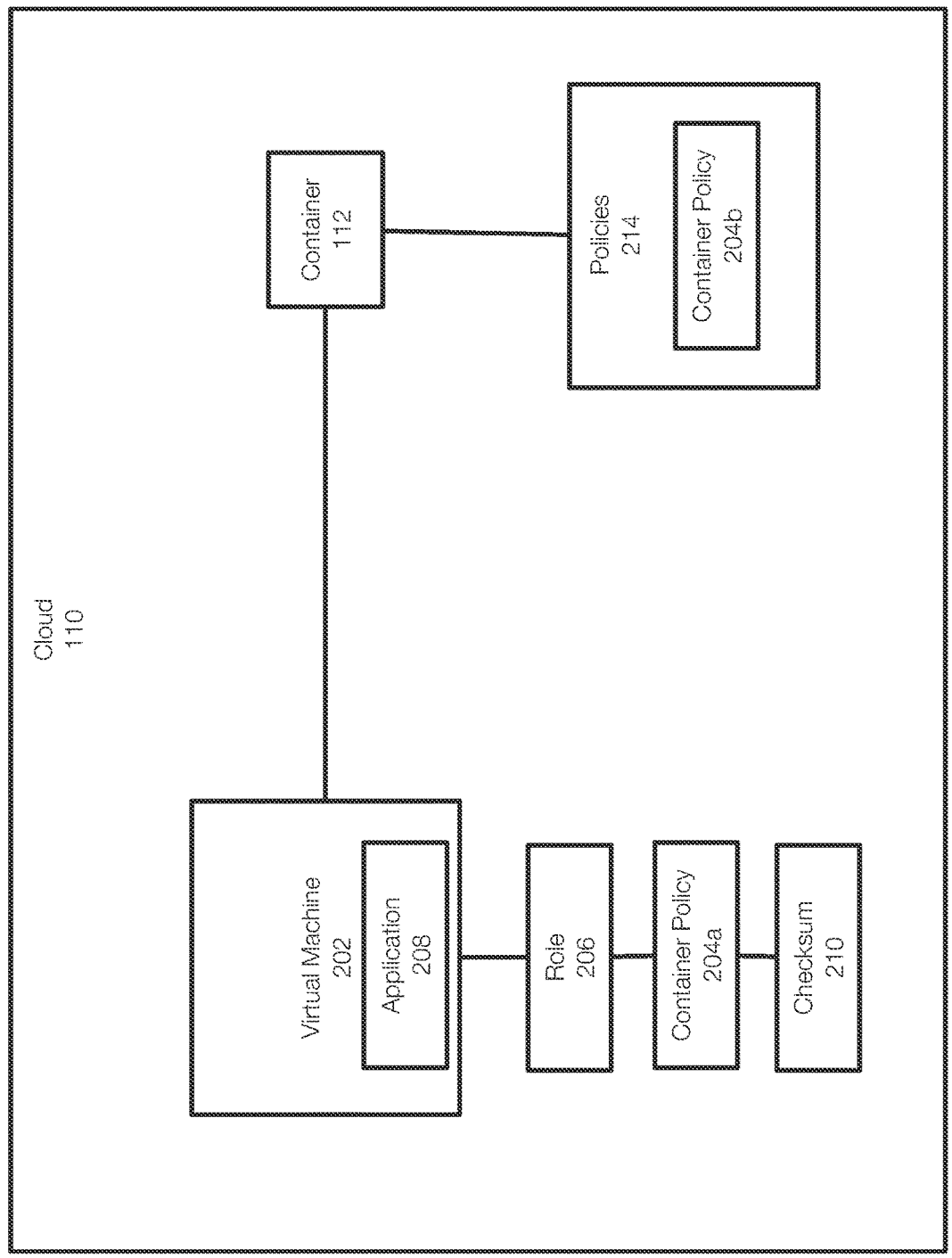
FIG. 2 discloses aspects of data protection operations based on roles and role-based policies.

FIG. 2 discloses aspects of performing data protection operations including attack related operations in the context of role-based access. FIG. 2 illustrates that role-based access, by way of example only, may occur within the context of the cloud 110, or intra-cloud. Often, this occurs within the cloud 110 of the same provider.

With role-based access, the application 208 may operated within a virtual machine 202 (or a container in a containerized environment) inside the cloud 110. The application 208 operating on the virtual machine 202 may access the container 112 using temporary credentials that are assigned to the role 206 attached to the virtual machine 202. More specifically, the application 208 may acquire temporary credentials that are used to access and operate on the container 112. In this example, there is no user account or access keys. Rather, a specific role 206 is attached to the virtual machine 202.

The role 206 defines which container 112 the virtual machine 202 (or application 208) can access and all operations that can be performed. The role 206 may also define a trust relationship of who can assume this role. For example, the role 206 may be attached to users in addition to virtual machines or the like.

In FIG. 2, a container policy 204a is generated that only allows the specific virtual machine 202 to access the container 112. For example, the container policy 204a may specify an identifier of the virtual machine 202 or the instance identifier of the virtual machine 202 in the container policy 204a. The container policy 204a may also define all operations permitted for the role 206, the virtual machine 202, and/or the application 208, which operations are based on the needs of the application 208. With the container policy 204a, no other virtual machines or virtual machine instances can access the container 112 even if attached to the role 206.

Once the container policy 204a is prepared, the container policy is attached to the container 112 as container policy 204b in the policies 114. A checksum 210 of the container policy 204a may also be determined and stored separately in a location that can be accessed by the processes of the application 208.

The policies 114 and 214 and their checksums are typically stored in different locations and in read-only form, to protect from tampering. If the application needs to enhance, alter, restrict the permissions in the policies, the policies may be regenerated. The regenerated policies are then applied to the user and/or the bucket. The checksum values are also updated to reflect the changes to the policies.

Figure 3:
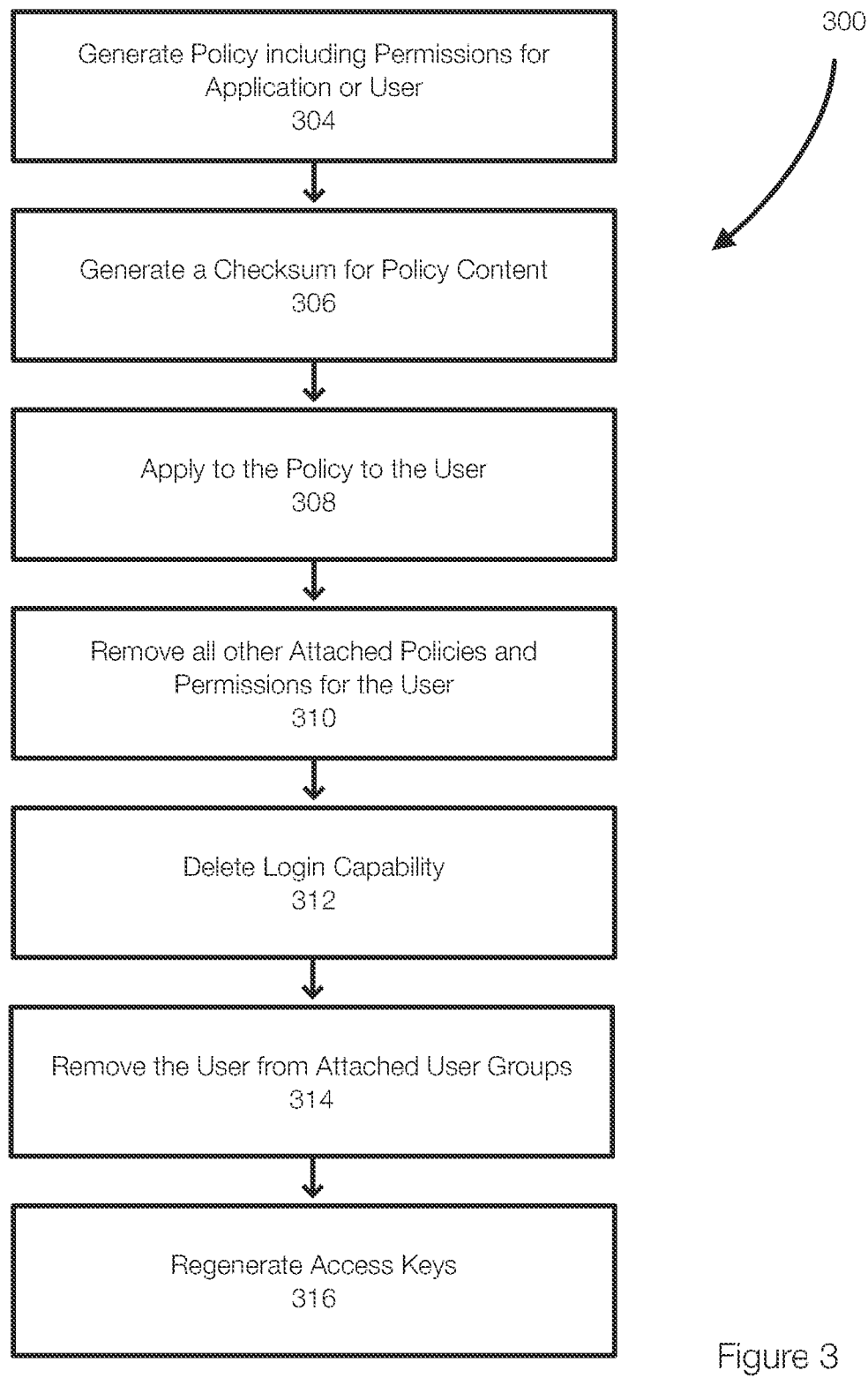
FIG. 3 discloses aspects of configuring attack related operations, including the generation of user policies, for key based access.

FIG. 3 discloses aspects of generating a user policy. FIG. 3 is related to FIG. 4, which generates a container policy. Aspects of FIGS. 3 and 4 may overlap. For example, the container policy may be generated and applied before the method 300 finishes.

The method 300 relates, by way of example only, to generating a user policy in the context of key-based cloud access or using access keys. More generally, the method 300 relates to generating the user policy and a checksum. Generating the user policy may include sanitizing the user (or the user's account in the cloud) by stripping all existing permissions or policies from the user and adding only those permissions to the user policy that are needed for the application. In one example, the method 300 may be performed by the application.

Initially, the user policy (e.g., in XML) is generated 304. The policy is generated to include all relevant permissions such as user administration permissions, cloud operation permissions, cloud function permissions, log operation permissions, batch operations, and the like. The user administration permissions may be added initially, as the user is managed from within the application itself. The container or cloud permissions are added as the primary use is to access the container. The generated user policy is then stored in a secure manner, on-disk and in the application in one example.

After the user policy is generated 304, a checksum is generated 306 for the policy. The checksum may be generated using or is derived from the XML content of the user policy. The checksum is calculated and stored separately in a location that can be accessed by the application.

Once the checksum is determined, the policy is attached or applied 308 to the user (or to the user account) in the cloud, using cloud APIs for example. Next, all other attached policies and permissions that exist for the same cloud user are removed 310. At this stage, the cloud user should only have the permissions that are specified in the user policy stored by the application.

Next, login capability (if present for the cloud provider) is removed 312. As a result of deleting login capability, only programmatic access is present using previously generated access keys/secret keys.

Next, the user is removed 314 from other user groups that the user may be attached to. This helps ensure that, with respect to accessing a container, that other permissions are not acquired by the user in the user policy.

Finally, keys such as access keys and secret keys for programmatic access are regenerated 316. Any keys stored locally or that are used by the application are updated with the new keys. Advantageously, these keys are only known to the application and are not known outside of the system.

Figure 4:
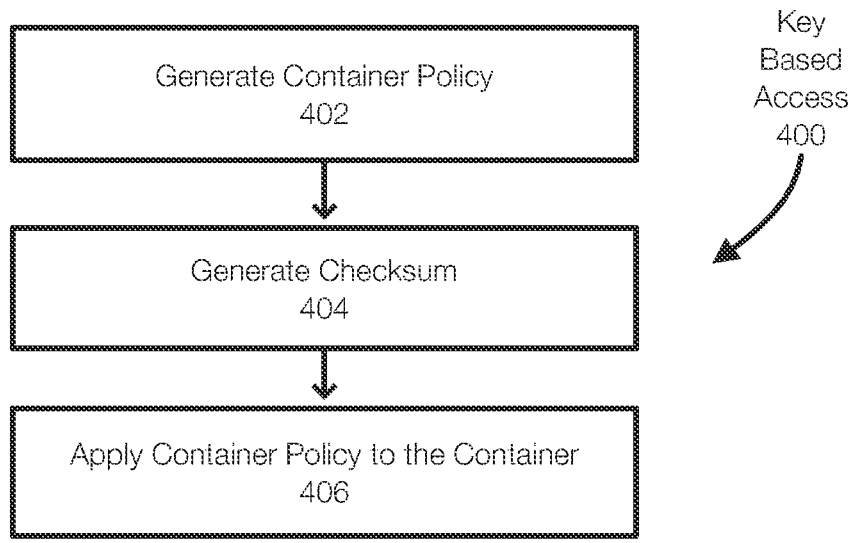
FIG. 4 discloses aspects of associating policies associated with key based access with containers in the cloud.

FIG. 4 discloses aspects of generating a container policy for key based access. The method 400 may be performed once the container is created and available to the application. The method 400 may initially generate 402 a container policy. The policy includes details of the user (or the application) and the operations that the user or application can perform on the container. The container policy may only allow access to the current user. Next, a checksum or other identifier is generated 404 from the container policy. The container checksum, an example of a local checksum, is stored securely and is accessible to the application. The container policy is then applied 406 to the container in the cloud.

Figure 5:
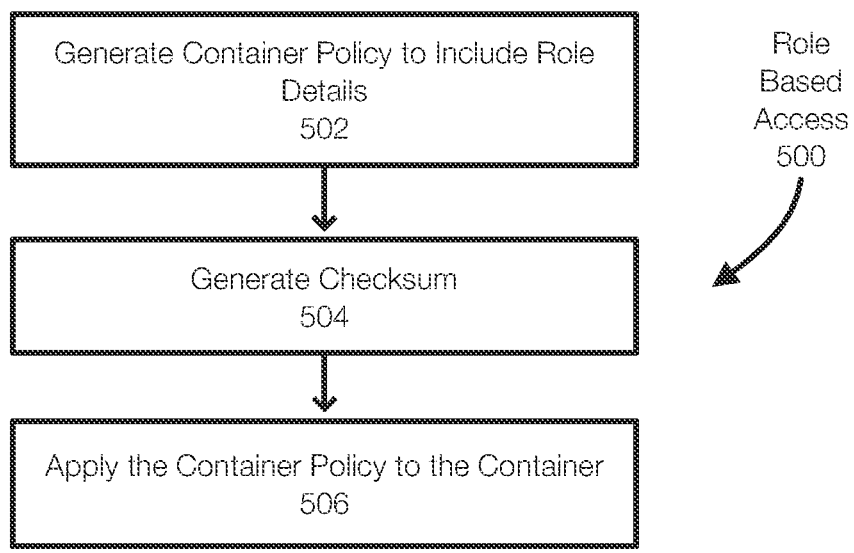
FIG. 5 discloses aspects of associating policies associated with role-based access with containers.

FIG. 5 discloses aspects of generating a container policy for role-based access. Generally, the method 500 generates and applies a container policy for the role and a virtual machine instance. With role-based access, the application is generally within the virtual machines inside the same cloud. The application can access a container via temporary credentials that are assigned to the role. These temporary credentials keep on changing automatically.

The method 500 may generate 502 a container policy that includes details regarding the role and the operations that the role can perform on the container. The role, which is reflected in the container policy, identifies which container can be accessed and what operations can be performed. Generating the policy may include adding the virtual machine instance that is allowed to operate on the container to the container policy. Once the container policy for the role is generated, a checksum or other identifier is generated 504. The checksum is a local checksum and is stored locally on-disk to the virtual machine instance and is accessible to the application. The container policy is then applied 506 to the container in the cloud.

Using this container policy for the role, the application can define what operations are permitted for this role and this virtual machine instance. No other virtual machine instance can access the container, even if attached to the same role.

Figure 6:
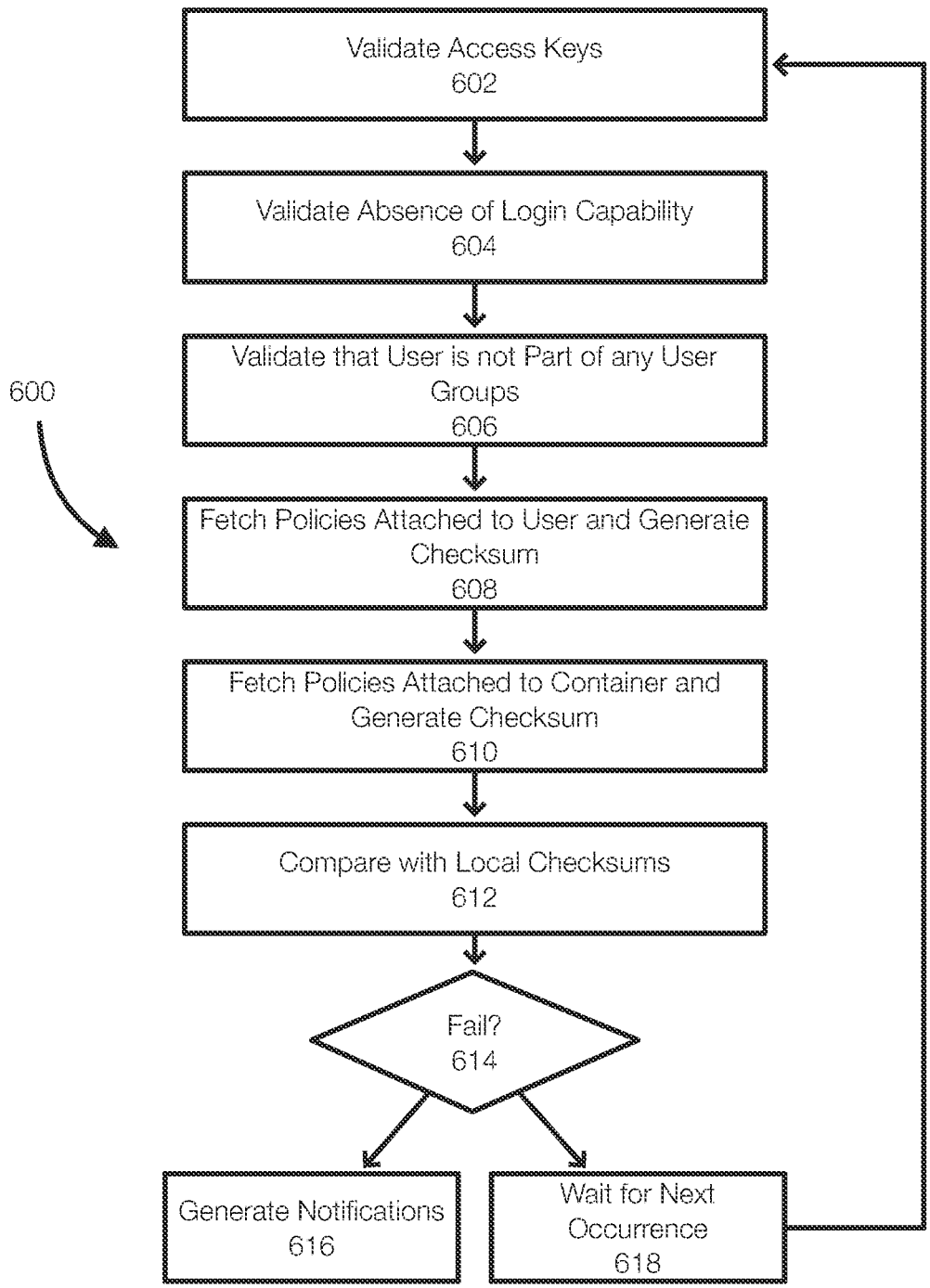
FIG. 6 discloses aspects of an attack related operation.

FIG. 6 discloses aspects of a data protection operation such as an attack related operation. The method 600 may operate once the policies have been created, checksums have been generated, and the policies have been attached as appropriate to the user/container/virtual machine in the cloud.

When the method 600 is performed, multiple validations may be performed. Each validation may be indicative of a problem, such as an attack. The method 600 may be an independent process in the application and can be performed regularly (e.g., every 5 or 10 minutes) or according to another schedule.

The method 600 may be initiated by the user or the application. In this example, the keys (e.g., access keys and secret keys) are validated 602 one the method is initiated. Next, the absence of login capability using user credentials (distinct from access keys) is validated 604 if login is still disabled. This may occur only in situations where the ability to disable login is present. The method 600 may then validate 606 that the user is not part of any other user groups.

The method 600 may then fetch policies for the user (e.g., the user policy) and generate 608 a checksum for each retrieved policy. The policies attached to the container are also fetched and a checksum is generated 610. The checksums generated from the user policy and the container policy (whether a key based container policy or a role based container policy) the cloud are compared with the locally stored checksums 612.

If any of these checksum comparisons or validations fail (Y at 614), notifications are generated 616 so that appropriate actions can be taken. More specifically, if any of these validations fail, the method 600 may treat the fail as a breach or an attack and issue appropriate alerts and notifications (e.g., alerts, SNMP traps, email, SMS). These notifications allow corrective actions to be performed to contain the attack and prevent data from being compromised.

If the checksum comparisons or validations do not fail (N at 614), the method 600 may sleep and then repeat during a next occurrence 618 of the method 600. As previously stated, the method may be performed periodically.

Embodiments of the invention thus provide a secure environment for an application to access cloud data. The policies for the user and the container are generated and then applied. This helps ensure that changes to the policies made from outside the system can be detected. If an attacker modifies policies from a cloud provider console, embodiments of the invention detect these modifications and allow corrective actions to be performed. Detecting a single possible attack allows preventative or corrective actions to be performed. This can be performed on any application/device that supports cloud storage, such as backup servers, backup applications, primary storage servers, secondary storage servers, or the like.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, disaster recovery operations, and attack prevention, operations, attach remediation operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example. Embodiments of the invention may also be containerized and implemented using container based systems.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising obtaining, by a user operating in an application, a policy associated with a container in a cloud storage, generating a checksum from the policy, comparing the checksum with a local checksum generated from a local copy of the policy, and generating an alert to perform a corrective action when the checksum and the local checksum do not match.

Embodiment 2. The method of embodiment 1, wherein the policy includes one or more of a user policy attached to the user, a container policy attached to the container, and a role attached to the container.

Embodiment 3. The method of embodiment 1 and/or 2, further comprising validating access keys associated with the application, wherein the access keys include an access key and a secret key.

Embodiment 4. The method of embodiment 1, 2, and/or 3, further comprising validating that the user cannot login and that the user is not part of any user groups.

Embodiment 5. The method of embodiment 1, 2, 3, and/or 4, further comprising generating the policy at the application.

Embodiment 6. The method of embodiment 1, 2, 3, 4, and/or 5, wherein generating the policy includes setting permissions in the policy, the permissions including one or more of administration permissions, cloud access permissions, log access permissions, object modification or deletion permissions and all other such permissions.

Embodiment 7. The method of embodiment 1, 2, 3, 4, 5, and/or 6, wherein the permissions include only permissions required by the application or user to operate.

Embodiment 8. The method of embodiment 1, 2, 3, 4, 5, 6, and/or 7, further comprising attaching the policy to the user in the cloud and detaching all other permissions and policies from the user.

Embodiment 9. The method of embodiment 1, 2, 3, 4, 5, 6, 7, and/or 8, further comprising deleting a login capability such that the user cannot login to a console.

Embodiment 10. The method of embodiment 1, 2, 3, 4, 5, 6, 7, 8, and/or 9, further comprising regenerating access and secret keys.

Embodiment 11. The method of embodiment 1, 2, 3, 4, 5, 6, 7, 8, 9, and/or 10, wherein the policy is a role policy, further comprising attaching the role policy to the container, wherein the role policy allows a single virtual instance to access the container and identifies permissions for operations to be performed in the container.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
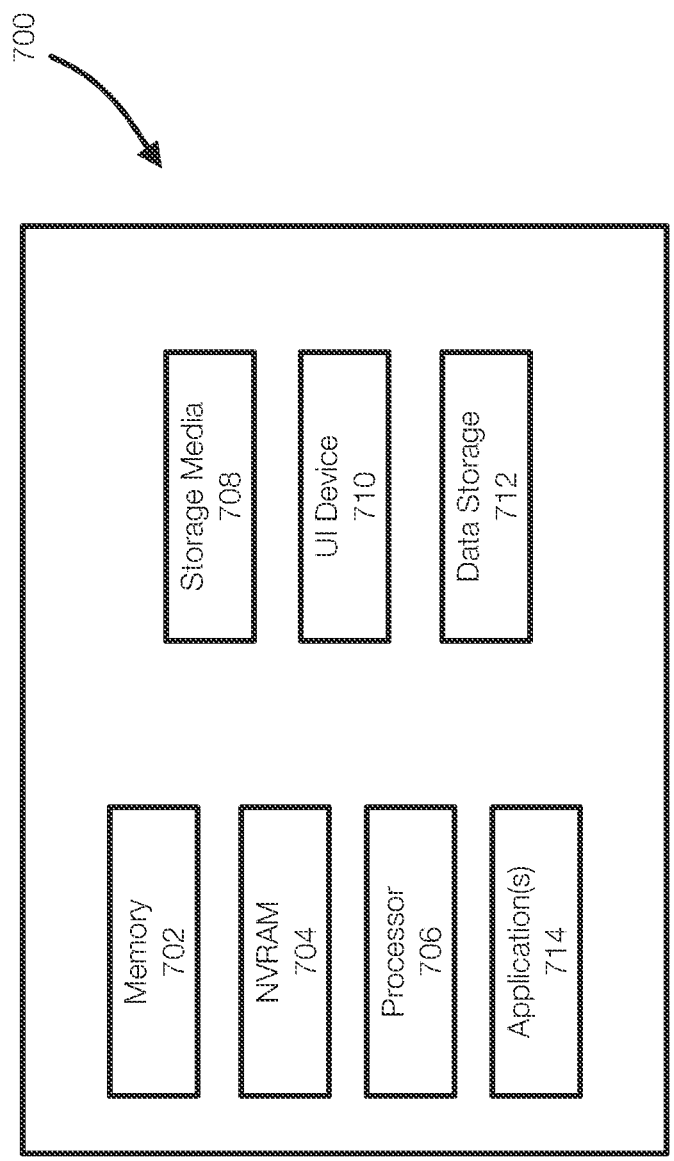
FIG. 7 discloses aspects of a computing machine or a computing system.

With reference briefly now to FIG. 7, any one or more of the entities disclosed, or implied, by FIG. 7 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting attacks on data stored in a cloud storage in a cloud, the method comprising:
   generating a policy including permissions for an application, wherein the application is configured as a cloud user;
   storing the policy as a local policy accessible to the application from a first storage that is local to the application;
   generating a local checksum of the policy;
   applying the policy to the cloud user as a local policy;
   associating the policy to the data stored in the cloud storage as a cloud policy, wherein the cloud policy is stored in the cloud storage;
   removing all other policies that exist for the cloud user if present such that the cloud policy only includes permissions specified in the local policy;
   deleting login capability of the cloud user using credentials such that the cloud user is required to use access keys to access the data stored in the cloud;
   generating the access keys;
   repeating periodically or according to a schedule, validating the access keys and performing:
      retrieving the cloud policy from the cloud storage;
      generating a cloud checksum from the cloud policy;
      comparing the cloud checksum with the local checksum generated from the local policy; and
      determining that the data in the cloud storage is being attacked and generating an alert to perform a corrective action when the cloud checksum and the local checksum do not match.

2. The method of claim 1, wherein the policy includes one or more of a user policy attached to the cloud user, a container policy attached to a container in the cloud storage storing the data, and a role policy attached to the container.

3. The method of claim 1, wherein the access keys include an access key and a secret key.

4. The method of claim 1, further comprising validating that the cloud user cannot login using the credentials and that the cloud user is not part of any user groups.

5. The method of claim 1, further comprising generating the policy at the application.

6. The method of claim 5, wherein generating the policy includes setting permissions in the policy, the permissions including one or more of administration permissions, cloud access permissions, log access permissions, and/or object modification or deletion permissions.

7. The method of claim 5, further comprising setting any attribute, permission or role that can modify or delete data stored in the container.

8. The method of claim 6, wherein the permissions include only permissions required by the application or the cloud user to operate.

9. The method of claim 5, further comprising attaching the policy to the cloud user in the cloud and detaching all other permissions and policies from the cloud user in the cloud.

10. The method of claim 5, wherein deleting the login capability prevents the credentials from being used to login to a console.

11. The method of claim 5, further comprising regenerating the access keys, the access keys including an access key and a secret key.

12. The method of claim 5, wherein the policy is a role policy, further comprising attaching the role policy to a container in the cloud storage configured to store the data, wherein the role policy allows a single virtual instance to access the container and identifies permissions for operations to be performed in the container.

13. A non-transitory storage medium having stored therein instructions that are executable by one or more hardware processors to perform operations for detecting attacks on data stored on cloud storage in a cloud, the operations comprising:
   generating a policy including permissions for an application, wherein the application is configured as a cloud user;
   storing the policy as a local policy accessible to the application from a first storage that is local to the application;
   generating a local checksum of the policy;
   applying the policy to the cloud user as a local policy;
   associating the policy to the data stored in the cloud storage as a cloud policy, wherein the cloud policy is stored in the cloud storage;
   removing all other policies that exist for the cloud user if present such that the cloud policy only includes permissions specified in the local policy;
   deleting login capability of the cloud user using credentials such that the cloud user is required to use access keys to access the data stored in the cloud;
   generating and the access keys;
   repeating periodically or according to a schedule, validating the access keys and performing:
      retrieving the cloud policy from the cloud storage;
      generating a cloud checksum from the cloud policy;
      comparing the cloud checksum with the local checksum generated from the local policy; and
      determining that the data in the cloud storage is being attacked and generating an alert to perform a corrective action when the cloud checksum and the local checksum do not match.

14. The non-transitory storage medium of claim 12, wherein the policy includes one or more of a user policy attached to the cloud user, a container policy attached to a container in the cloud storage storing the data, and a role policy attached to the container.

15. The non-transitory storage medium of claim 12, wherein the access keys include an access key and a secret key.

16. The non-transitory storage medium of claim 12, further comprising validating that the cloud user cannot login and that the cloud user is not part of any user groups.

17. The non-transitory storage medium of claim 12, further comprising generating the policy at the application.

18. The non-transitory storage medium of claim 16, wherein generating the policy includes setting permissions in the policy, the permissions including one or more of administration permissions, cloud access permissions, log access permissions, and/or object modification or deletion permissions.

19. The non-transitory storage medium of claim 17, wherein the permissions include only permissions required by the application or cloud user to operate.

20. The non-transitory storage medium of claim 16, further comprising attaching the policy to the cloud user in the cloud and detaching all other permissions and policies from the user, wherein deleting the login capability prevents the cloud user from using the credentials to login to a console, and regenerating the access keys for programmatic access, wherein the policy is a role policy, further comprising attaching the role policy to a container in the cloud storage configured to store the data, wherein the role policy allows a single virtual instance to access the container and identifies permissions for operations to be performed in the container.

* * * * *